United States Patent [19] [11] 4,167,014

Darling et al. [45] Sep. 4, 1979

[54] CIRCUITRY FOR PERFECTING INK DROP PRINTING AT VARYING CARRIER VELOCITY

[75] Inventors: Richard H. Darling, Monte Sereno; Francis J. Perry, Morgan Hill, both of Calif.

[73] Assignee: International Business Machines Corporation, Armonk, N.Y.

[21] Appl. No.: 772,197

[22] Filed: Feb. 25, 1977

[51] Int. Cl.[2] ........................ G01D 15/18; G01D 9/00

[52] U.S. Cl. ........................................ 346/75; 346/1

[58] Field of Search .................................. 346/1, 75

[56] References Cited

U.S. PATENT DOCUMENTS

| | | | |
|---|---|---|---|
| 3,555,558 | 1/1971 | Sherman | 346/75 |
| 3,834,505 | 9/1974 | Fowler et al. | 346/75 X |
| 3,925,787 | 12/1975 | Suzuki | 346/75 |
| 3,964,591 | 6/1976 | Hill et al. | 346/75 X |
| 4,030,591 | 6/1977 | Martin et al. | 197/53 |
| 4,037,230 | 7/1977 | Fujimoto et al. | 346/75 |
| 4,044,880 | 8/1977 | Martin | 197/18 |
| 4,050,564 | 9/1977 | Carmichael et al. | 346/75 X |
| 4,101,006 | 7/1978 | Jensen et al. | 400/144.3 |

FOREIGN PATENT DOCUMENTS 1136388 12/1968 United Kingdom .

*Primary Examiner*—George H. Miller, Jr.
*Attorney, Agent, or Firm*—George E. Roush

[57] ABSTRACT

Electronic lead determining circuitry operates to advantage with nonlinear relative movement between a paper record medium and an ink drop projector carrier of ink drop printing apparatus. Electronic lead determining circuitry is arranged for calculating the proper lead times for displacing the normal print enabling signals by factors dependent on the actual carrier positions and the lead for projecting ink drops at the desired positions.

Ink drop printing apparatus of the type having a carrier bearing an ink drop projector across a record medium at a velocity relative to the record medium which may be varying substantially—either by design or unintentionally—, and bearing print position location detecting elements, and bearing ink drop projection controlling elements is perfected by controlling electronic circuitry for calculating lead time at a given print position for enabling printing at a predetermined designated print position precisely at the predetermined desired location on the paper. Preferably, a velocity-time profile for the apparatus is chosen for low g-force loading of the moving components, and printing is effective over most of the profile in contradistinction to conventional printing over linear portions only of conventional profiles. Phase locked oscillator loop circuitry is used for tracking the carrier position and adjusting phase, while several alternate lead calculating circuits are arranged in cooperation therewith. Print position and carrier travel direction data are updated in real time as the apparatus operates under data processing control.

4 Claims, 8 Drawing Figures

CIRCUITRY FOR PERFECTING INK DROP PRINTING AT VARYING CARRIER VELOCITY

This invention is related to the invention described and claimed in copending U.S. patent application Ser. No. 772,196 of Phillip Keith Hoskins and Harmon Wesley Johnson, filed on the same day for "Circuitry for Perfecting Ink Drop Printing at Nonlinear Carrier Velocity."

The invention relates to Ink Drop Printing apparatus and it particularly pertains to obtaining faster throughput by the use of nonlinear velocity profile with electronic circuitry for perfecting the trajectory of the ink drops to the paper so as to arrive precisely at the intended position, however, the invention is also adaptable to other varying velocity apparatus for perfecting a similar desired operation.

Ink drop printing apparatus has been devloped to the state where the copy produced under rather closely controlled conditions is excellent even when judged by demanding standards. Present efforts are bent toward maintaining the quality while producing copy at very high speeds.

Apparatus for impact printing "on-the-fly" has been developed to the state where the throughput is very high indeed, but the quality is classed as "readable with ease" in most every instance.

Apparatus for producing a large volume of printed documents of high quality is not to far off in time. One area of interest centers about the relative travel of a record medium traversed by a carrier bearing an ink drop projecting mechanism.

Conventional high constant speed ink drop printing apparatus involves undue loading on the moving carrier parts and thus exhibits adverse variations in the relative velocity of an ink drop projector passing over a paper record medium. Examples of prior art arrangments pertinent to an understanding of the invention are found in the following U.S. Pat. Nos.:

3,181,403; 5/1965, Sterns et al, 83/76;
3,539,895; 11/1970, McGee, 318/570;
3,657,627; 5/1972, Inaba et al, 318/601;
3,898,671; 8/1975, Berry et al, 346/75;
3,911,818; 10/1975, MacIlvaine, 101/426;
3,912,913; 10/1975, Bunting, 235/150.1;
3,938,163; 2/1976, Fujimoto et al, 346/75;
3,940,675; 2/1976, Schroeder, 318/603.

The patents to Stern et al, to McGee, to Inaba et al and to Schroeder are directed to machine tool control arrangements having associated circuitry for tracking one or both of two relatively moving machine elements and adjusting the rate of travel of one for arriving at a desired predetermined condition by electronic digital circuitry having pulse generators, digital registers and comparing circuitry in common. The calculation of lead and the interpolation of present position data is absent from these disclosures.

The patent to Bunting is directed to a computer controlling arrangement wherein a desired condition is represented by a digital number, a digital input is generated representing a change to be made in a time predetermined by programming and the change subtracted from the first number and the difference number is compared to a number corresponding to the instantaneous (present) condition for exercising control. Interpolation of slope corresponding to the digital number representing the predetermined change is within the skill of the artisan, but the calculation of lead is necessarily absent by definition.

The remaining patents are directed to ink drop printing apparatus. That of Fujimoto et al is directed to the deflections of drops of ink projected to the paper for correcting skew in the vertical direction brought about by carrier travel during each vertical scan over a multiple of drop positions. This skew is corrected by a separate set of electrostatic deflection plates arranged at the proper angle for compensation according to a predetermined arrangement. Step-by-step correction is not contemplated and lead is not a factor.

The patent to Berry et al is directed to the conventional constant velocity form of apparatus without compensation for varying velocity of a carrier across the paper as the arrangement has a constant speed carrier drive, despite a compensating circuit connected to this drive for insuring that no random variation occurs at print time.

The patent to MacIlvaine is perhaps the closest art in that it is directed to a computer controlled ink drop printing system and incorporates circuitry for registration and alignment, for example, of a sheet of paper inserted loosely as by hand, to a predetermined location and/or within a predetermined margin with respect to that location. In addition to timing signals related to web speed, a "top-of-the-form" pulse is generated and the printing adjusted thereto. Lead is not involved and interpolation of present carrier position and/or timing signals is absent.

The arrangement according to the invention differs from the arrangements in any of the prior art references in that it pertains to a method of recording data by apparatus of the type having a record receiving member and a carrier member arranged for a relative movement in a predetermined manner, a recording member arranged on the carrier member, and recording operation controlling elements and recording position determining elements coupled to the controlling elements and arranged on at least one of the members. A preliminary step of the method comprises selecting a velocity-time characteristic for the design of the apparatus which will make it more effective for through-put of the records.

Further the method comprises the steps of moving the carrier member with respect to the record receiving member at a velocity varying with the relative position of the carrier member with respect to the record receiving member, sensing the position of the carrier member with respect to predetermined record element receiving positions on the record receiving member, sensing the instantaneous velocity of the carrier member, calculating the lead time on the basis of the instantaneous position and instantaneous velocity of the carrier member for generating a record enabling signal, and enabling the recording operation controlling elements according to the calculation for recording the record on the record receiving member at a predetermined designated position.

The method according to the invention is readily carried out by the various embodiments of apparatus as described and claimed in the aforesaid U.S. patent application Ser. No. 772,196 and wherein an ink drop projector carrier is moved across a paper record in accordance either a velocity-time or a velocity-position profile predetermined for operating in acceleration and deceleration with favorable throughput with respect to g-force ($F=ma$ in units of g) loading on moving components, and basic printing position control is exercised by a position indicating pulse generated for each position where a picture dot element (pixel) is to be printed and interpolation measures, either in the form of analog excursions or a predetermined number of interpolation pulses, are generated between each succeeding pair of pixel pulses. Preferably, analog excursions are converted to digital pulses. The lead in terms of interpolation pulses then is calculated and added to the (instantaneous) present position count of pixel pulses. A comparing circiut compares this count with a count representative of the next pixel print position under consideration, and when equality is determined, the ink dot projector is enabled to print a dot.

More specifically the method according to the invention is carried out in ink drop printing apparatus having a paper web record medium moved longitudinally (one or more pixel lines in succession), at uniform increments and an ink drop projector carrier moving traversely of the paper web medium at a velocity subject to some variation relatively large with respect to only slight or negligible variation of a stream of ink drops projected over a relatively constant trajectory. A position sensing device is arranged for generating an electric pulse, or at least one transition thereof, at pixel positions across the web where ink drops are to be deposited as dots or be deflected away to leave blanks (dots of opposite sense). The train of position pulses, or transitions, is used as the addresses of the pixel positions and also as triggering transitions for generating interpolation transitions between pulses and based on the time of occurrence of the last position transition. These interpolation pulse transitions are spaced apart by a distance substantially of the order of a nominal error which results from the variation in velocity of the ink drop projector carrier moving across the paper web.

Other parameters being held within the desired and/or required tolerances by design of the machine, the variation in pixel positioning is reduced to and held within the same equivalent tolerance by selecting the ink drops for printing the data at the desired position on the basis of the algebraic sum of the position of the projector and the lead being equal to the address of the desired print position. The print position address is generated at the velocity of the carrier at a given pixel position for projection at the next pixel position removed from the desired pixel print position by the lead calculated.

In practice, the desired pixel position address is placed in a register under data processor control, the calculated position is placed in another register under processor control, and the contents of the register compared as in a comparing circuity. The contents of the second register are updated as the carrier passes each print position. When the contents of the two registers are identical, the ink drop projector is enabled, and the drop is projected or deflected according to the data to be displayed under data processor control.

It is advantageous in some applications to print as the carrier moves in either direction across the web. A bistatic signal level is generated in a carrier direction sensing device and applied to the calculating circuitry for adding or subtracting the lead to or from the position address.

More specifically, according to the invention, the electronic circuitry incorporates the advantageous features of the Phase Locked Oscillator (PLO) loop circuit for tracking and interpolating the position of the carrier as it is moved across the record medium. In one basic embodiment of the invention, a pair of phase locked loop circuits are interconnected for tracking the carrier and for adjusting the lead for ultimately producing an ink drop projector enabling signal where the desired interpolation tolerance obtains with the two PLO loop circuits operating at intergrally related rates.

In another basic embodiment according to the invention, the requirement for integrally related rates is obviated by an analog interpolation measuring arrangement. An electromagnetic auxilliary sensing arrangement is arranged for providing leading and/or lagging analog interpolation between succeeding print positions for adjusting the lead.

Analog-to-Digital (A/D) converting circuitry is contemplated with this and other circuit arrangements according to the invention.

Programmed Read Only Store (PROS) and/or table-lookup arrangements are also contemplated as will be described in greater detail hereinafter.

In order that the full advantages obtain in the practice of the invention, preferred embodiments thereof, given by way of example only, are described hereinafter with reference to the drawing forming a part of the specification, and in which.

While the invention is applicable to many different arrangements of ink drop printing and like apparatus, it will be described hereinafter, in the interest of clarity, as it is applied to exemplary apparatus of basic form. A fixed frame is arranged with a paper web carrier that is stepped in the longitudinal direction a preselected number of ink drop pixels or dot lines at a time. Preferably, but not necessarily, a stepping motor is used for this purpose. An ink drop projector carrier is arranged in the frame for relative travel laterally across the paper web. While it should be understood that the ink drop projector may be fixed and the paper web carrier made to move laterally as well as longitudinally, in the preferred arrangement, the ink drop projector is mounted on a movable carrier and is moved laterally therewith. The ink drop projector is moved at 254 cm/sec (100 in/sec.) and spaced 1.27 cm (0.500 in.) from the paper web. The ink is projected in a continuous stream of drops having a velocity of 1270 cm/sec. (500 in./sec.) and printing is effected by selectively deflecting drops away from the paper into a return gutter and projecting drops onto the paper in accordance with the data to be recorded. For each dot to be recorded, the time for four drops of ink is usually taken with three drops being projected and the time for the fourth used in actuating the drop deflection circuitry. Different times, of course, are used in different machines and/or applications. Normally, a stream of the order of 380 drops/cm (960 drops/in.) insures the desired definition. The apparatus is capable of printing at a definition of 47.25 pixel/cm (240 pixel/in). This spacing and velocity results in 41.7 microseconds time spacing or a pulse recurrence frequency of 12.5 KHz. The printing apparatus is fitted with a position sensing device—preferably, but not necessarily an optoelectronic arrangement—producing a train of position pulses, or preferably impulses, corresponding to the positions—95 transitions/cm (240 transitions/in)—at which the dots are to be placed, and another sensing device for indicating the direction of travel of the carrier across the paper web. Control of the apparatus preferably is effected with electronic circuitry in the interest of flexibility, efficiency, and cost.

Figure 1:
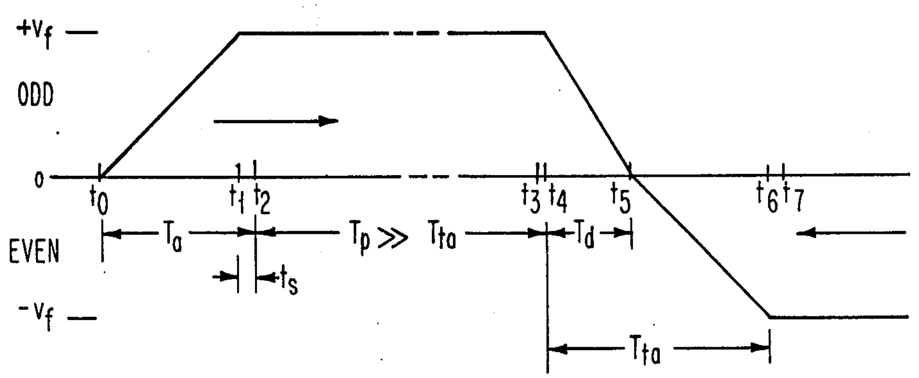
FIG. 1 is a graphical representation of velocity and time relationship for conventional printing systems.

FIG. 1 is a graphical representation of the recording turnaround time cycle of conventional printing apparatus, particularly as it would apply to ink drop printing on a single pass (at a time) across a paper web. As the carrier begins traversing the web at time $t_o$ it is accelerated until time $t_1$ to bring it up to full velocity. Then a short time $t_s=t_1-t_2$ is allowed for settling after which printing may take place between times $Tp=t_2-t_3$ at constant velocity, which is maintained usually with some difficulty, but which is necessary because a fixed lead is timed by the traverse motor for precisely locating the printing. Usually, printing is stopped a short time before the end of the constant speed phase at time $t_3$–$t_4$ to insure complete linear operations. The carrier is then decelerated to time $t_5$, at which the direction of travel is reversed for the succeeding pass. Acceleration is undergone again, but in the opposite sense, until time $t_6$. The turnaround time $T_{ta}$ is equal to a decelerating time, $T_d=t_3-t_5$, and a subsequent acceleration time $T_a=t_5-t_6$. As seen on inspection, the turnaround time is long, and this necessarily reduces the throughput proportionally.

According to the invention, precise printing location is determined in arrangements operating in either nonconstant or constant traversing velocity modes. Not only is such a system operable during at least portions of acceleration and deceleration phases of a cycle, but also in such arrangements where there is a substantially constant velocity phase, the requirement for strict constancy is relaxed, whereby the extra high cost involved in such requirement is avoided. A print position timing impulse generating arrangement is connected to electronic circuitry for determining the actual instantaneous velocity at the position of the carrier at the last printing and the lead necessary for optimum positioning at the next printing. Thus, a velocity-position profile such as that shown in FIG. 1 is usable to better advantage with a system according to the invention, but because of the abrupt knees other profiles are preferred.

Figure 2:
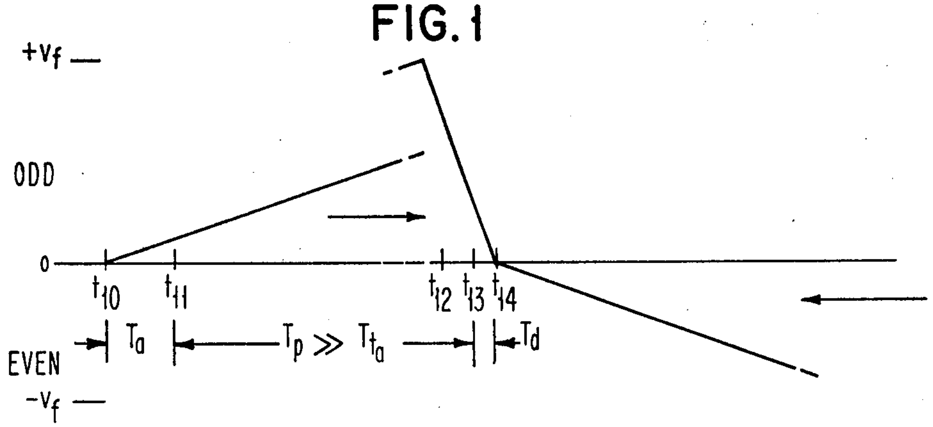
FIG. 2 is a graphical representation of another velocity and time relationship for embodiments of the invention.

FIG. 2 is a graphical representation of a velocity profile for such a cycle for a nonconstant velocity system that enables a much greater throughput than with the flatter profile discussed above. The curve is essentially an acceleration phast $t_{10}$–$t_{12}$ followed by a deceleration phase $t_{12}$–$t_{14}$ having a large print time $Tp=t_{11}-t_{13}$ and relatively short turnaround time $T_{ta}$ equal to the sum of $T_a$ from $t_0$–$t_{11}$ and $T_d$ from $t_{13}$–$t_{14}$ for each half cycle.

Figure 3:
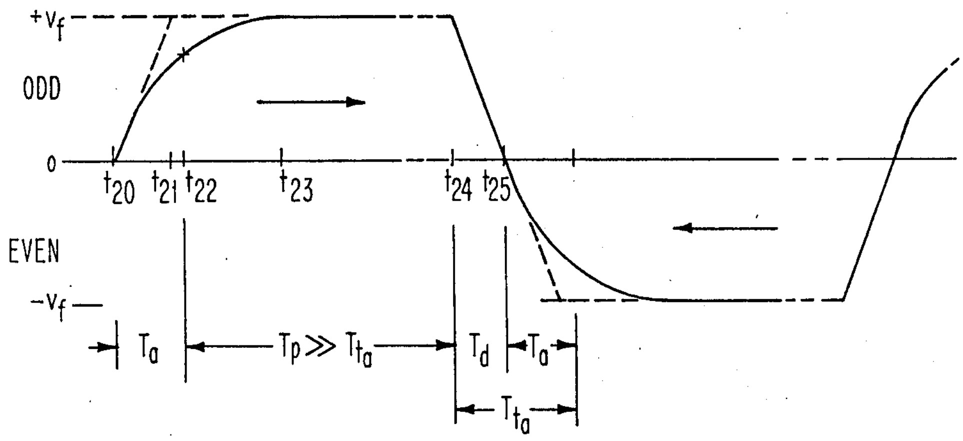
FIG. 3 is a graphical representation of a further velocity and time relationship for preferred embodiments of the invention.

Preferably, a more generalized velocity-time profile like that represented in FIG. 3 is used in apparatus according to the invention. The acceleration and deceleration phases $t_{20}$–$t_{23}$ and $t_{24}$–$t_{25}$ respectively are shorter and a rather constant, but not necessarily so, velocity phase extends from time $t_{23}$–$t_{24}$, but in which inadvertent variations in velocity, as at any other part of the cycle are relatively harmless.

While the invention is not so limited, stepping motor drive is preferred as the torque characteristics thereof lend them to the type of application involved. For constant drive parameters, stepping motor torque tends to fall off exponentially with speed as indicated by the velocity profile graphically represented by FIG. 3. During the acceleration phase $T_a$ and during the print phase $T_p$ the velocity at a given instant is:

$$v=v_f(1-e^{-t/\tau}) \quad (1)$$

where $v_f$ is the ultimate velocity;

t is the time; and $\tau$ is the transport time constant.

Stepping motor deceleration tends toward linearity, so that during the deceleration phase $T_d$ $$v=-at \quad (2)$$

where a is the acceleration constant

According to the invention, the transport time constant $\tau$ is made equal to the deceleration time $T_d$ for eliminating any tendancy for discontinuity at zero velocity. Conveniently, the turnaround time $(T_a+T_d)$ is set equal to the paper increment time whereby $$T_a/T_d=1.2 \quad (3)$$

Acceleration and deceleration displacements are equal, whereby print time can be commenced at $$v=0.7v_f \quad (4)$$

for constant length lines;

and no acceleration-deceleration or settling overtravel is necessary. It should be understood clearly that those skilled in the art will readily adapt the teaching herein to change the length of lines (or N any pass) as desired.

Figure 4:
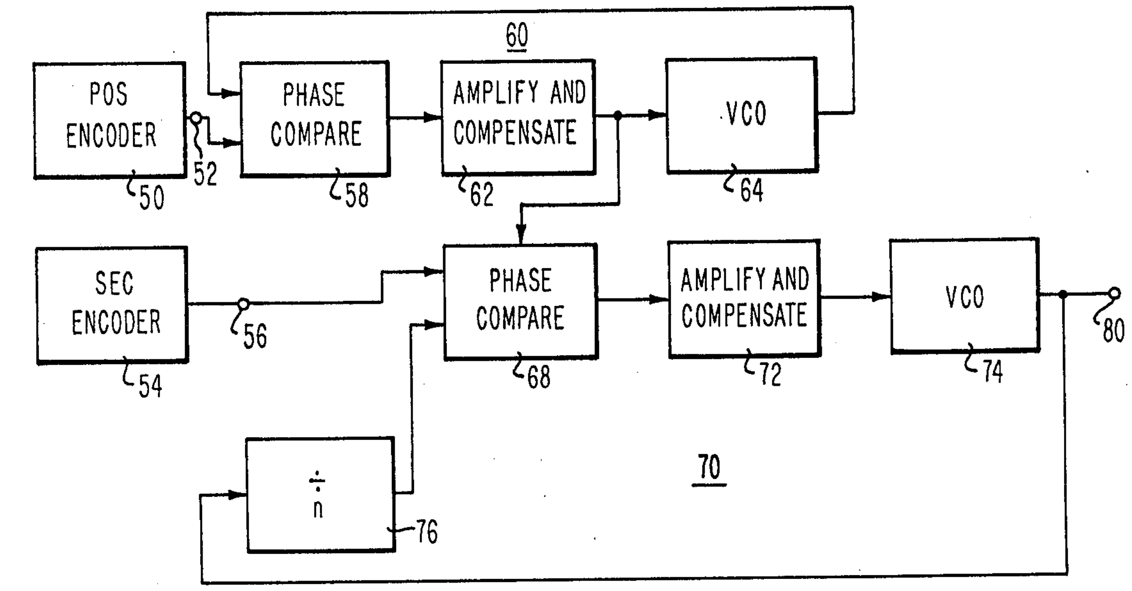
FIGS. 4–8 are functional diagrams of electronic circuitry according to the invention for calculating lead and for controlling the actuation of ink drop printing apparatus.

FIG. 4 is a functional diagram of circuitry according to the invention, for enabling an ink drop projector moving at a given not necessarily constant velocity at the precise instant desired for applying a drop of ink to a paper record or preventing such application in accordance with the information to be recorded. This circuit is arranged for measuring velocity and determining the lead necessary for application of an enabling signal to ink drop projecting gating circuitry. A position encoder 50 is arranged to deliver a series of electric impulses at position signal terminals 52 indicative of the passage of an ink drop projector carrier by the succeeding desired print positions across the paper. A second encoder 54 delivers a series of impulses indicative of position in terms of the rotational velocity and direction of a continuously rotating stepping motor as it drives the carrier across the paper at direction signal terminals 56. This second encoder is arranged in known fashion to use the series of impulses for controlling the stepping motor and as a source of impulses extending over a band wide enough to bring the lead (up to 24 pixels) to the frequency at which the phase difference between the transitions on which the enabling signal is based can be compared with the use of output interpolation circuitry to be described. An input lead of a digital phase comparing circuit 58 is connected to the position signal terminals 52 and the other terminals connected in a phase locked loop circuit 60 having an amplifying and compensating circuit 62 and a voltage controlled square wave generating circuit 64 connected in cascade to the output terminals and the remaining input terminals of the phase comparing circuit 58. This loop circuit functions as an interpolation circuit and is connected to an analog phase comparing circuit 68 of another phase locked loop circuit 70. Another amplifying and compensating circuit 72, a voltage controlled square wave generating circuit 74 and a dividing circuit 76 complete this second loop circuit, with the direction signal input terminals connected to input terminals of the phase comparing circuit 68. The analog tachometer loop circuit 60 serves to control the phase at which the lead loop circuit 70 is locked to the second encoder 54. In this particular arrangement, the motor encoder delivers impulses to the terminals 56 indicative of direction of travel as well as transition impulses occurring in time and phase over a range of $4\pi$ radian whereby coincidence at the phase comparator 68 is the uncorrected lead and the analog voltage at the input to the VCO 64 is the interpolation to be algebraically added to the lead for triggering the VCO 74 at the precise time for enabling the ink drop deflection components. Thus, as the velocity increases, the phase of the output pulses of the voltage controlled generator at terminals 80 advances and the loop gain is adjusted so that the advance just matches the desired lead. The motor encoder spacing is necessarily a multiple n or submultiple 1/n of the position spacing, but this is not a serious limitation in many applications.

Figure 5:
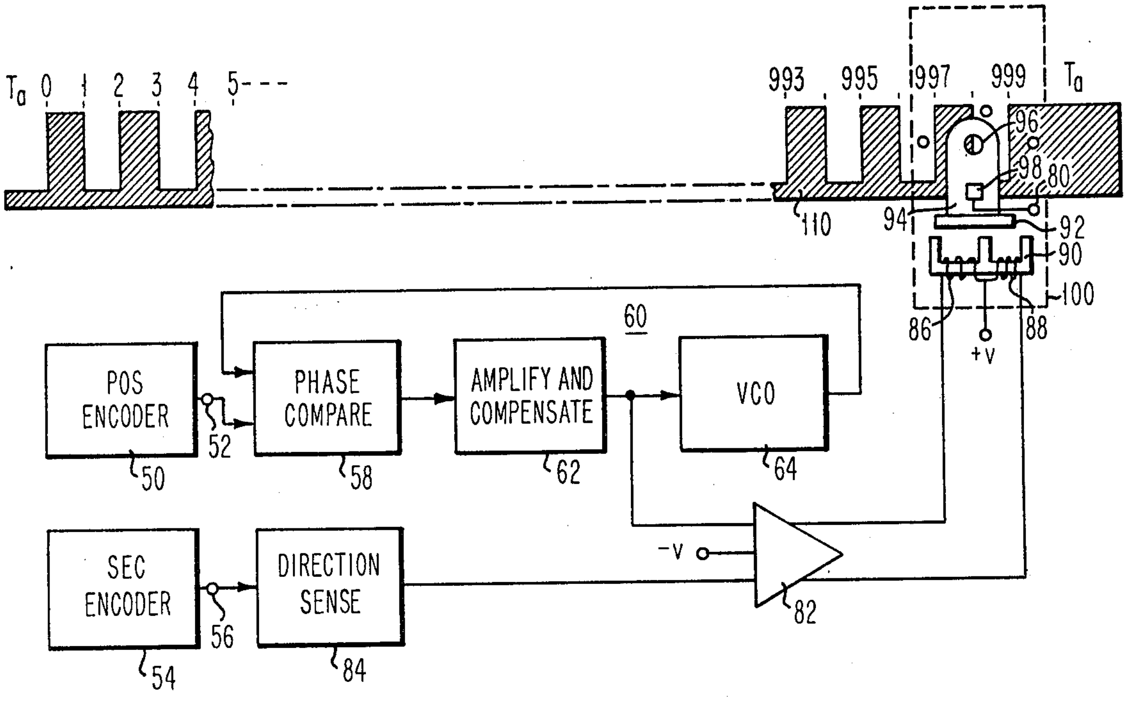

A similar though different approach is diagrammed in FIG. 5. Like or similar components have been given the same reference numerals, and those skilled in the art will readily adapt where slight differences are in order. The analog tachometer phase locked loop circuit 60 is connected to one input terminal of a differential amplifying driver circuit 82. The motor encoder circuit terminals 56 are connected through a direction sensing circuit 84 to the other input terminal of the differential driver circuit 82. The direction sense circuit 84 serves to add or subtract the lead from the instantaneous position in accordance with the direction of carriage travel across the web. The balanced output of the driver circuit 82 is applied to a tapped winding 86, 88 on an electromagnetic core 90 of an electromechanical assembly of which only the bare essentials are shown here. Differential excitation of the winding 86–88 offsets a ferromagnetic bar 92 from a center position, at which it is urged by conventional means such as a pair of light springs (not shown). The bar 92 carries a mask member 94 having an optical aperture stop 96 therein. This electromechanical assembly is mounted on an ink drop projecting carrier, indicated here only generally by the dashed-line rectangle 100. The core 90 and the winding 86, 88 are fixed with respect to the carrier 100 while the bar 92 and mask 94 are free to move $\pm 0.038$ mm ($\pm 150$ mils) in the assembly. The carrier is driven by a continuously stepped motor across the frame of the apparatus and of course, across the paper web carried in the frame by conventional structure not shown in the interest of clarity. An optical scale 110 is arranged on the frame so as to cooperate with optical sensing elements on the carrier, which elements actually are parts of the position encoder 50. The light/dark transitions of the scale 110 are spaced precisely one dot position 0.21 mm apart. An optoelectronic transducer shown only generally by a rectangle 98 produces a pulse in response to the interpolated scale reading which is delivered at the output terminals 80 for enabling the ink drop printing gating circuitry as before. The movement of the mask 94 advances the phase of the position encoder much as in the previous embodiment and an adjustment of the gain again provides a match between the phase advance and the required ink drop charge time lead.

Figure 6:
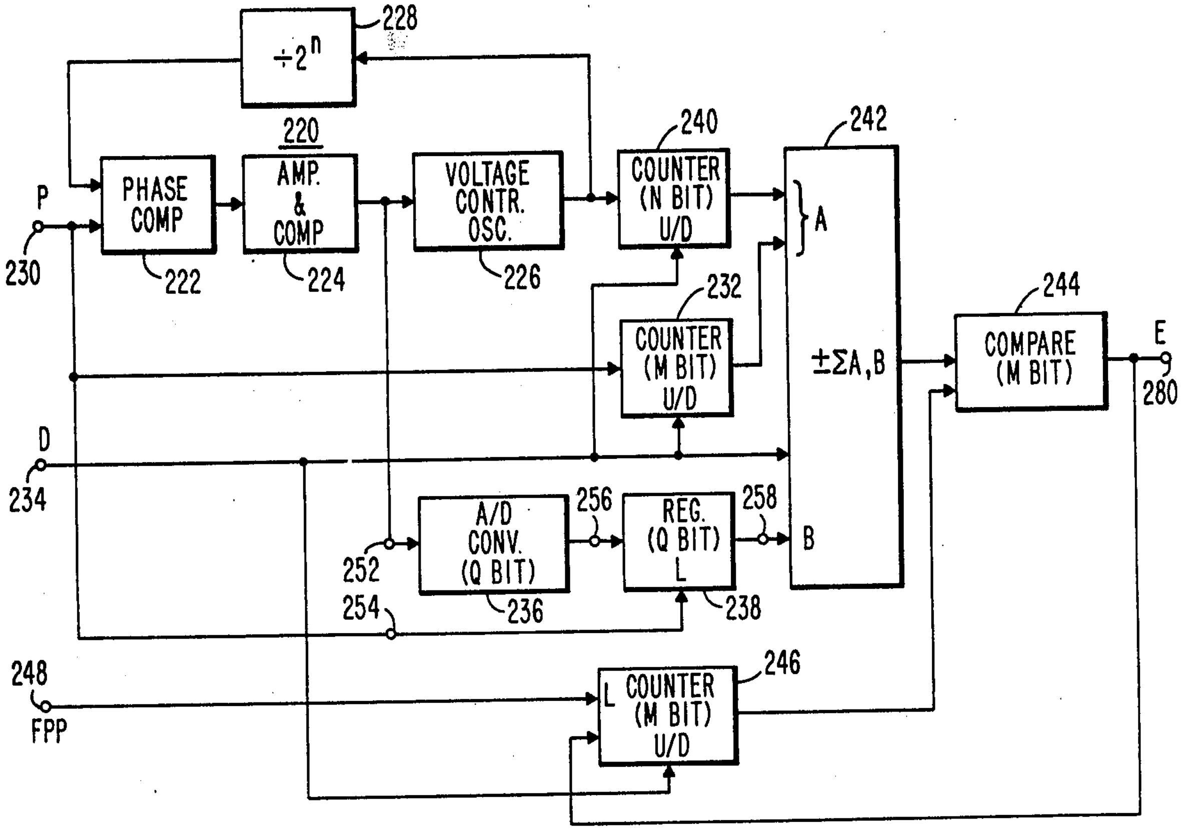

A further circuit embodiment is shown in FIG 6. Again, a Phase Locked Oscillator (PLO) type analog interpolation tachometer is used. This loop circuit 220 comprises a phase comparing circuit 222, an amplifying and compensating circuit 224, a voltage controlled square wave generator 226 and dividing circuitry 228. A series of electric impulses indicative of instantaneous carrier position are applied at position signal input terminals 230 for application to the phase comparing circuit 222. The $2^n$ divider circuitry is part of the interpolating circuitry and therefore increases the resolution by that factor. An up/down m-bit counter circuit 232 serves to track the absolute carrier position with respect to a fixed reference, with the direction of travel accounted for by an electric level applied at direction input terminals 234 for counting up or down. The analog output of the PLO is applied to analog-to-digital (A/D) converting circuitry 236 for generating a digital lead number (or "word") which is transferred to a Q bit register 238 each time an impulse is received at terminals 230 indicating a new position of the carrier with respect to the paper. An n-bit counter 240 connected to the voltage controlled square wave generator 226 and the counter 232 supply carrier position data to arithmetic logic circuitry (ALC) 242, with carrier direction accounted for, and the lead word from the register 238 is added to or subtracted from the position indication as interpolated. Incidentally, for printing in one direction across a page, the output of the interpolation counter 228 is applied directly to the ALC 242 saving the counter circuit 240. An m-bit comparing circuit 244 is connected between the logical adding circuit 242 and the enabling pulse output terminals 280 in this embodiment for withholding the printing function until a first print position as loaded into a counter 246 in response to data from the central processor applied at terminals 248.

Figure 7:
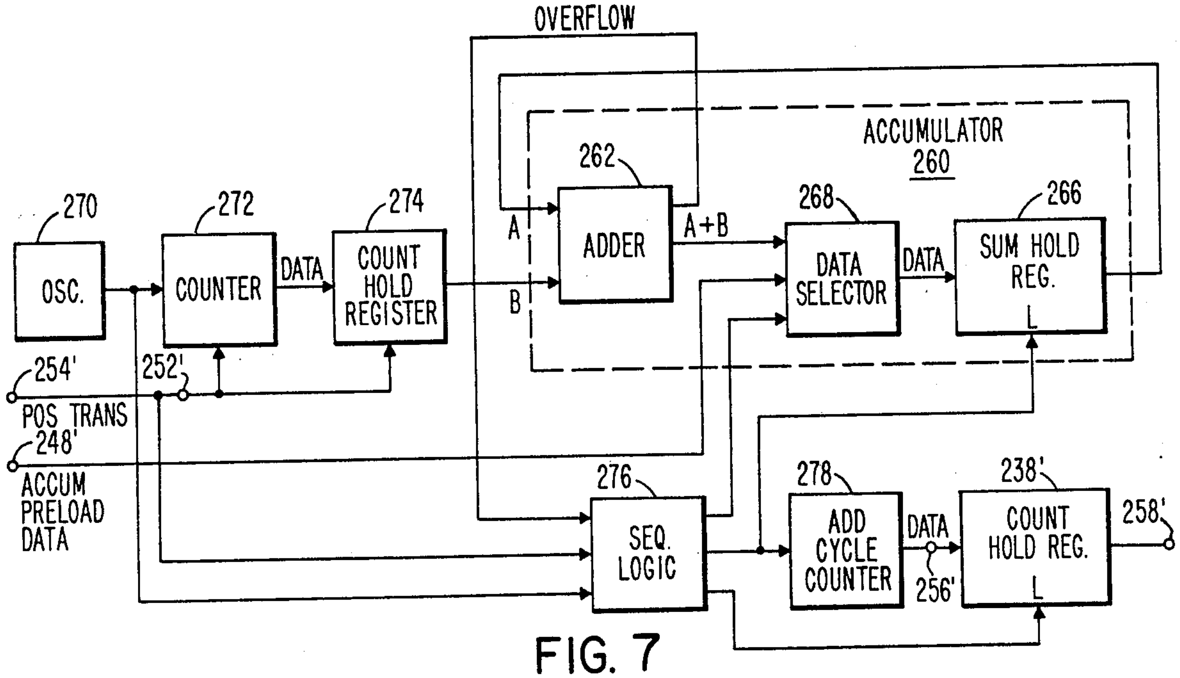

FIG. 7 is a logical functional diagram of alternate circuitry useful in the arrangement just previously described in place of the A/D converter circuit 236 and register 238, although it is not limited to this application but is especially desirable as an equivalent for the more expensive A/D converter circuit. The arrangement shown calculates a digital velocity number (word) directly from time measurements. An iterative addition (subtraction) process is used in a dividing operation. The circuitry comprises an accumulator circuit 260 having an n-bit adding circuit 262 and a sum hold register circuit 266, preferably connected together by a data selector circuit 268 for reasons which will appear. This accumulator circuit 260 has a capacity of $(2^{n+1}-2)$. The time period between two position pulses as appear at position input transition terminals 254' is measured by a square wave generator 270 and a counting circuit 272; the count is stored temporarily in a count-hold register circuit 274. The pulse repetition rate of the generator is chosen to provide a desired resolution, and preferably it is crystal controlled for the precision desired. A 5 MHz crystal is used with most systems, but this frequency is not controlling.

Sequence logic circuitry 276 connected to the generator 270, to the position input terminals 254' and to an overflow terminal of the adding circuit 262 has an output data line connected to an add cycle counter 278 and sequencing lines connected to the sum-hold register 266 and a count hold register 238'. The constant distance d is subtracted from the capacity of the accumulator 260 by adding the inverse of the number d.

let $$y=2^{n+1}-d \quad (5)$$

The value y is presented to the adding circuit 262 as addend A while the time measurement number (T) previously stored in the sum-hold register 266 is presented as addend B. At the output of the adding circuit then the sum of y+T is selected by the data selector 268 in response to operation of the sequence logic circuitry 276 for passing on to the sum-hold register 266. Upon loading the latter register, addend A will become (y+T) and (y+2T) will appear at the input of the sum-hold register 266. Thus, each application of a lead pulse to the sum-hold register 266 becomes an add cycle and after m−1 such add cycles, the accumulator 260 will overflow. Then $$y+mT=2^{n+1} \quad (6)$$

and m is the value of velocity sought. This obtains in the add cycle counter 278 and is loaded into the count-hold register 238'.

Figure 8:
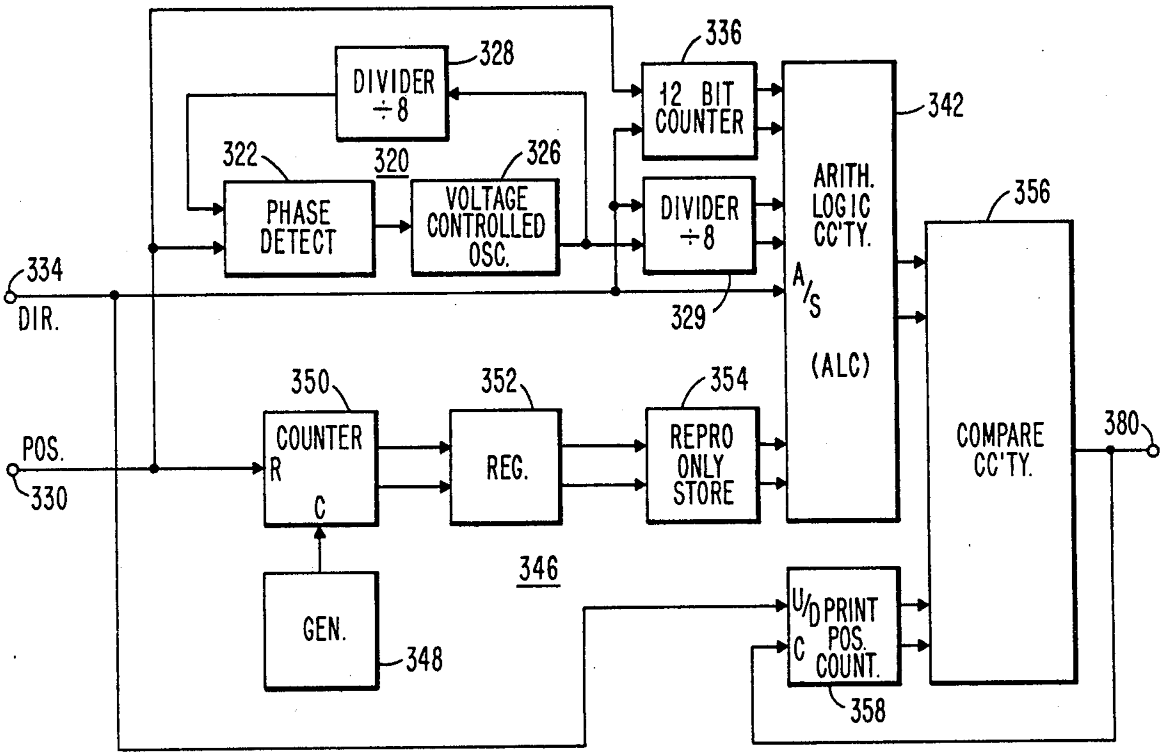

FIG. 8 shows still another embodiment of the invention using a phase locked loop oscillator (PLO) 320 comprising a phase detecting circuit 322, a voltage controlled square wave generator 326, and a dividing counter circuit 328. For the resolution desired in this application for which this embodiment was designed a resolution factor of 8 was used. Those skilled in the art will alter the counter or a succeeding dividing counting circuit 329 to provide the resolution desired. This loop circuit is used to track the carrier. A train of position input impulses is generated as the carrier moves across the web, and the impulse train is applied at position signal input terminals 330 converted to the loop circuit 320 at the phase detecting circuit 322. An electric level indicative of the direction of carrier travel across the paper is generated and applied at direction signal input terminals 334. The dividing counting circuit 329 and a 12 bit counting circuit 336 connected to the square wave generator 326 are position counters, with the first dividing counting circuit 329 serving as an interpolating circuit effectively dividing the position resolution between print positions into 8 parts. Printing is effected in either direction, as intimated hereinafter, so that the direction signal level at terminals 334 are applied to these counting circuits 329 and 336 and to the Arithmetic Logical Circuitry (ALC) 342, the latter of which accepts the output position counts from the counting circuits 336 and 329.

Lead at the instantaneous velocity is determined by circuitry 346 comprising an oscillator 348, a counting circuit 350 connected to the oscillator 348 and to position input signal terminals 330. The prr of the oscillator 348 is fixed at 5 Mpps, preferably by crystal control. The counting circuit 350 is arranged to count pulses from the oscillator 348 between position signal pulses at the terminals 330 and this count is transferred to a register 352 connected in cascade to an address register for a Programmed Reproduce Only Store (PROS) 354 as the address to the PROS for that instant. The output of the PROS is the lead and is then applied to the arithmetic logic circuitry (ALC) 342.

The position as indicated by the coarse and fine output numbers from the counting circuit 336 and 329 and the lead as indicated by the output of the ROS 354 are algebraically combined in the ALC 342 applied to comparing circuitry 356 having an output line connected to a reversible counting circuit 358, connected to the direction signal level input terminals, for counting up or down in accordance with the direction of travel of the carrier. The output of this print position counting circuit is applied to the comparing circuit 356.

The ALC 342 is updated 8 times between consecutive position pulses and the lead is updated between every two position pulses. Thus, the velocity and the corresponding lead is determined for one position ahead of the position at which the record is made.

While the invention has been shown and described with reference to a few specific embodiments thereof, it should be clearly understood that those skilled in the art will make changes without departing spirit and scope of the invention as defined in the appended claims concluding the specification.

The invention claimed is:

1. A method for recording data by apparatus of the type having
   - a record receiving member and a carrier member arranged for movement in a predetermined manner with respect to each other,
   - a recording member arranged on said carrier member, and
   - recording operation controlling elements and recording position determining elements coupled to said controlling elements and arranged on at least one of said members,
   - said method comprising the steps of
   - selecting a single continuous velocity-time characteristic profile for moving said carrier member, and moving said carrier member with respect to said record receiving member at a velocity varying with the relative position of said carrier member with respect to said record receiving member,
   - sensing the instantaneous positions of said carrier member with respect to predetermined record element receiving positions on said record receiving member,
   - sensing the instantaneous velocity of said carrier member,
   - calculating the lead times on the basis of the instantaneous position and instantaneous velocity of said carrier member for generating a record enabling signal, and
   - enabling said recording operation controlling elements according to the result of the lead time calculations for recording said data on said record receiving member at predetermined designated positions.

2. A method for perfecting ink drop printing by apparatus of the type having
   - a record medium and a carrier member arranged for movement in a predetermined manner with respect to the record medium,
   - an ink drop projector arranged on said carrier member, and
   - ink drop controlling elements and print position determining elements coupled to said controlling elements and arranged on said carrier member,
   - said method comprising the steps of moving said carrier with respect to said record medium at a velocity varying with the relative position of said carrier member with respect to said record medium, sensing the position of said carrier with respect to predetermined print positions, sensing the instantaneous velocity of said carrier member, calculating the lead time for a print enabling signal on the basis of the instantaneous position and instantaneous velocity of said carrier member, and enabling said ink drop controlling elements according to said calculation for printing said record medium at a predetermined designated position.

3. A method for perfecting ink drop printing as defined in claim 2 and including a preliminary step of selecting a velocity-time characteristic profile for moving said carrier.

4. A method for perfecting the marking of a record by apparatus of the type having a record medium and a carrier member arranged for continuous movement in a predetermined manner with respect to the record medium, a marking member arranged on said carrier member, and marking member controlling elements and marking position determining elements coupled to said controlling elements and arranged on said carrier member, said method comprising the steps of moving said carrier member with respect to said record medium at a single continuous velocity-time characteristic profile velocity continuously varying with the relative position of said carrier member with respect to said record, sensing the instantaneous positions of said carrier member with respect to predetermined marking positions, sensing the instantaneous velocity of said carrier member, calculating the lead times for a marking enabling signal on the basis of the instantaneous position and instantaneous velocity of said carrier member, and enabling said marking member controlling elements according to the results of the lead time calculations for marking said record medium at predetermined designated positions.

* * * * *